US010390058B2

United States Patent
Karnik et al.

(10) Patent No.: US 10,390,058 B2
(45) Date of Patent: Aug. 20, 2019

(54) DYNAMIC SERVICE FLOW CREATION FOR PACKET CABLE MULTIMEDIA QUALITY OF SERVICE GUARANTEE IN A DISTRIBUTED CABLE MANAGEMENT SYSTEM

(71) Applicant: Gainspeed, Inc., Sunnyvale, CA (US)

(72) Inventors: Rajesh Karnik, Cupertino, CA (US); Utku Yilmaz, Mountain View, CA (US); Philip Winterbottom, San Jose, CA (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/054,083

(22) Filed: Feb. 25, 2016

(65) Prior Publication Data

US 2016/0295252 A1 Oct. 6, 2016

Related U.S. Application Data

(60) Provisional application No. 62/142,426, filed on Apr. 2, 2015, provisional application No. 62/149,470, filed on Apr. 17, 2015.

(51) Int. Cl.
*H04N 7/173* (2011.01)
*H04N 21/2385* (2011.01)
(Continued)

(52) U.S. Cl.
CPC ....... *H04N 21/2385* (2013.01); *H04L 45/302* (2013.01); *H04L 45/38* (2013.01);
(Continued)

(58) Field of Classification Search
CPC ........... H04N 21/2221; H04N 21/2402; H04N 21/6118; H04N 21/6125; H04N 21/6371;
(Continued)

(56) References Cited

U.S. PATENT DOCUMENTS 7,649,848 B1 *  1/2010  Swan ................. H04L 12/2861
                                                           370/252
8,184,530 B1    5/2012  Swan et al.
(Continued)

FOREIGN PATENT DOCUMENTS

WO  PCT/US2016/025400    3/2016

OTHER PUBLICATIONS

International Search Report and Written Opinion for PCT/US2016/025400, dated Jul. 15, 2016, Gainspeed, Inc.
(Continued)

*Primary Examiner* — Mulugeta Mengesha
(74) *Attorney, Agent, or Firm* — Loza & Loza, LLP; Jessica W. Smith

(57) ABSTRACT

Some embodiments provide a method for dynamically creating a service flow for an Ethernet node (EN) in a distributed cable management system that includes a cable headend and several in-the-field ENs for connecting several service nodes to the headend. For a particular device of a particular service node, the method receives a request for a Packet Cable Multi-Media (PCMM) connection session that is to have a quality of service (QoS) guarantee. For the request, the method identifies the EN that connects to the particular service node from a group of several EN that the method manages. The method then forwards a set of authorized dynamic QoS (DQoS) parameters to the identified EN, so that the identified EN can use the forwarded DQoS parameter set to create a service flow for the particular device. In some embodiments, the identified EN creates two
(Continued)

service flows for the two different directions of traffic associated with the particular device at the particular service node. Specifically, the EN creates an upstream service flow for the upstream data traffic (i.e., data packets from the particular device requesting the PCMM connection session) and a downstream service flow for the downstream data traffic (i.e., data packets from the particular device requesting the PCMM connection session).

20 Claims, 8 Drawing Sheets

(51) Int. Cl.
| | |
|---|---|
| H04N 21/222 | (2011.01) |
| H04N 21/24 | (2011.01) |
| H04N 21/61 | (2011.01) |
| H04N 21/6371 | (2011.01) |
| H04N 21/643 | (2011.01) |
| H04L 12/721 | (2013.01) |
| H04L 12/725 | (2013.01) |
| H04L 12/927 | (2013.01) |

(52) U.S. Cl.
CPC ..... *H04N 21/2221* (2013.01); *H04N 21/2402* (2013.01); *H04N 21/6118* (2013.01); *H04N 21/6125* (2013.01); *H04N 21/6168* (2013.01); *H04N 21/6371* (2013.01); *H04N 21/64322* (2013.01); *H04L 47/805* (2013.01)

(58) Field of Classification Search
CPC ......... H04N 21/64322; H04N 21/2385; H04N 21/6168; H04L 45/302; H04L 45/38; H04L 47/805
See application file for complete search history.

(56) References Cited

U.S. PATENT DOCUMENTS

| | | | |
|---|---|---|---|
| 2002/0046406 A1* | 4/2002 | Chelehmal | H04N 7/17336 725/87 |
| 2004/0181811 A1* | 9/2004 | Rakib | H04L 63/062 725/122 |
| 2005/0073997 A1* | 4/2005 | Riley | H04L 29/06027 370/352 |
| 2005/0078609 A1 | 4/2005 | Sharma et al. | |
| 2005/0078688 A1* | 4/2005 | Sharma | H04L 12/2801 370/401 |
| 2005/0163060 A1 | 7/2005 | Riley et al. | |
| 2007/0286138 A1* | 12/2007 | Kaftan | H04L 12/5695 370/338 |
| 2011/0149966 A1* | 6/2011 | Pope | H04L 49/30 370/392 |
| 2011/0314086 A1 | 12/2011 | Finkelstein et al. | |
| 2012/0291084 A1* | 11/2012 | Rakib | H04N 7/10 725/111 |
| 2014/0101711 A1* | 4/2014 | Rakib | H04N 21/6118 725/129 |

OTHER PUBLICATIONS

EP Appln. No. 16774258.4. Extended European Search Report (dated Jul. 26, 2018).
Cable Television Laboratories. "PacketCable (TM) Technical Report, Multimedia Architecture Framework." (Oct. 29, 2009).
Cable Television Laboratories. "PacketCable (TM) Specification, Multimedia Specification." (Jun. 29, 2011).

* cited by examiner

DYNAMIC SERVICE FLOW CREATION FOR PACKET CABLE MULTIMEDIA QUALITY OF SERVICE GUARANTEE IN A DISTRIBUTED CABLE MANAGEMENT SYSTEM

BACKGROUND

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data. In the 1990's, a number of major electronics and cable operator companies, working through CableLabs, a non-profit R&D consortium, introduced the Data Over Cable Service Interface Specification (DOCSIS). First introduced in the late 1990's as DOCSIS version 1.0, and upgraded many times since (currently at DOCSIS version 3.0, with a draft DOCSIS 3.1 specification released in 2013), the DOCSIS standard defines the Physical Layers (PHY) and Media Access Control (MAC) layers needed to send relatively large amounts of digital data through coaxial cables that were originally designed to handle analog standard definition television channels.

This television signal was transmitted as a combination amplitude modulated signal (for the black and white portion), quadrature-amplitude modulated signal (for the color portion), and frequency modulated signal (for the audio portion), and this combined signal will be designated as a Frequency Division Multiplexed (FDM) signal. With the advent of digital television and high definition television standardization in the late 1980's and early 1990's, the basic 6 MHz bandwidth spectrum of analog television was retained, but the modulation scheme was changed to a more sophisticated and higher data rate Quadrature Amplitude Modulation (QAM) scheme, which can encode digital information onto a very complex QAM analog signal (waveform).

The DOCSIS standard was built upon this analog and digital TV foundation, and specified additional standards to provide broadband Internet services (Internet protocols, or IP), voice over IP, custom video on demand, and other modern services based upon the QAM data transmission waveforms previously established for digital and high definition television.

As a result, simple coaxial cables have been gradually upgraded to accommodate ever-increasing demands for digital data. At each house (or apartment, office, store, restaurant or other location), the household connects to the CATV cable by a cable modem, uses the cable modem to extract downstream DOCSIS digital data (frequently used for high-speed Internet), and inject upstream DOCSIS digital data (again frequently used for high-speed Internet applications).

Unfortunately, even in a coax cable, there is a finite amount of bandwidth available to transmit data. Coax cables and their associated radiofrequency interface equipment have typically only used the frequency range under about 1000 MHz, and so there are limits to how much data the 1950's era coaxial cable can ultimately transmit. By contrast, optical fiber (fiber optics, fiber) technology, which uses much higher optical frequencies (with wavelengths typically in the 800-2000 nanometer range), can transmit a much higher amount of data. Optical fiber data rates typically are in the tens or even hundreds of gigabits per second. Indeed, the entire RF CATV cable spectrum from 0 to 1000 MHz can be converted to optical wavelengths (such as 1310 nm or 1550 nm), be carried over an optical fiber, and then be converted back to the full RF CATV cable spectrum at the other end of the fiber, without coming close to exhausting the ability of the optical fiber to carry additional data. This conversion process can be achieved by relatively simple optical to digital or digital to optical converters, in which the CATV RF waveforms are simply converted back and forth to a light signal by simple ("dumb") E/O or O/E converters, located in nodes that connect optical fibers to CATV cable (fiber nodes).

Optical fiber technology has been widely used for high capacity computer networks, and these networks often do not use the DOCSIS protocols or QAM protocols to transmit data. Rather, these high capacity computer networks often use entirely different types of data transmission protocols, such as the Ethernet protocols IEEE 802.3ah, 1000BASE-LX10, 1000Base-BX10, and others. These networks and protocols are often referred to as GigE networks, which is an abbreviation of the Gigabyte speeds and Ethernet protocols used for fiber based computer network. Thus if a user desires to transfer computer data from RF QAM waveforms transported over a CATV cable to a high speed GigE fiber network, the data must be transformed back and forth between the DOCSIS cable QAM waveforms and the alternate protocols (often Ethernet protocols) used in fiber GigE networks.

Although ideally, the best way to satisfy the ever increasing household demand for digital data (e.g. video—on demand, high speed Internet, voice over IP, etc.) would be by extending optical fiber to each household, this would be an incredibly expensive solution. By contrast, cable based CATV solutions have already been implemented for tens of millions of households, and this expense has already been borne and amortized over decades of use, starting from the 1950s. As a result, it is far more economically attractive to find schemes enable the existing, if bandwidth limited, CATV cable system, to be further extended to meet the ever-growing demands for additional data.

SUMMARY

Some embodiments provide a method for dynamically creating a service flow for an Ethernet node (EN) in a distributed cable management system that includes a cable headend and several in-the-field ENs for connecting several service nodes to the headend. For a particular device of a particular service node, the method receives a request for a Packet Cable Multi-Media (PCMM) connection session that is to have a quality of service (QoS) guarantee. For the request, the method identifies the EN that connects to the particular service node from a group of several EN that the method manages.

The method then forwards a set of authorized dynamic QoS (DQoS) parameters to the identified EN, so that the identified EN can use the forwarded DQoS parameter set to create a service flow for the particular device. In some embodiments, the identified EN creates two service flows for the two different directions of traffic associated with the particular device at the particular service node. Specifically, the EN creates an upstream service flow for the upstream data traffic (i.e., data packets from the particular device requesting the PCMM connection session) and a downstream service flow for the downstream data traffic (i.e., data packets from the particular device requesting the PCMM connection session).

In some embodiments, the controller set forwards the authorized DQoS parameter set to the identified EN with a request that directs the identified EN to create the service flows and to define QoS parameters for the service flows based on the authorized DQoS parameter set. The DQoS parameter set in some embodiments can provide different QoS parameters for the upstream and downstream service flows. The DQoS parameter set can define the QoS guarantees that the identified EN uses to support a PCMM connection session that relays PCMM data packets, such as voice packets, video packets, game-application packets, etc.

In some embodiments, the method is performed by a set of one or more controllers that manages the group of EN. Also, in some embodiments, the method receives the PCMM connection session request from a policy server that is directed by a PCMM application server that processes a connection session request from the particular device at the particular service node. In some embodiments, the PCMM application server and the particular device exchange the connection session request through the identified EN but in an out-of-band communication channel that is transparent to the identified EN and the intermediate cable management system components (e.g., switch, packet engine, edge router) that may be in the path between the particular device and the PCMM application server. After receiving the connection session request from the particular device, the PCMM application server identifies the DQoS parameter set that is stored for the particular device, and directs the policy server to provide the DQoS parameter set to the controller set with the connection session request.

The method in some embodiments provides to both the policy server and the identified EN a service flow identification handle (called a gate identifier), so that the controller, the policy server and the identified EN have a common handle for referring to the connection session. In some embodiments, the method creates two gate identifiers (two Gate IDs) for a PCMM connection session request, with one Gate ID for an upstream service flow associated with upstream data traffic (i.e., data packets from the particular device requesting the PCMM connection session), and another Gate ID for a downstream service flow associated with the downstream data traffic (i.e., data packets from the particular device requesting the PCMM connection session). Providing two different gate identifiers for the two different directions simplifies the process of defining two (potentially different) QoS parameter sets for the two directions of data traffic.

In some embodiments, the service flow request can direct the identified EN to create a service flow that is immediately active, or to create a service flow that is initially inactive until the controller set can direct the identified EN to activate the service flow. This active/inactive feature is beneficial in embodiments where the PCMM application server can facilitate a PCMM-enabled device at the service node to set up phone calls through the PCMM cable management system infrastructure. This is because it allows the PCMM application server to ensure that the recipient of the call is available to receive the call before activating the service flow and starting PCMM connection session or charging the device for the call. It also allows the identified EN to reserve bandwidth for the service flow to ensure that once the service flow becomes active, there will be sufficient bandwidth to process packets for this flow.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a method for dynamically creating a service flow for an Ethernet node (EN) in a distributed cable management system that includes a cable headend and several in-the-field ENs for connecting several service nodes to the headend. For a particular device of a particular service node, the method receives a request for a Packet Cable Multi-Media (PCMM) connection session that is to have a quality of service (QoS) guarantee. For the request, the method identifies the EN that connects to the particular service node from a group of several EN that the method manages.

The method then forwards a set of authorized dynamic QoS (DQoS) parameters to the identified EN, so that the identified EN can use the forwarded DQoS parameter set to create a service flow for the particular device. For the requested PCMM connection session, the identified EN in some embodiments creates two service flows, an upstream service flow for the upstream data traffic (i.e., data packets from the particular device requesting the PCMM connection session) and a downstream service flow for the downstream data traffic (i.e., data packets from the particular device requesting the PCMM connection session). Also, the forwarded DQoS parameter set in some embodiments can provide different QoS parameters for the upstream and downstream service flows. In some embodiments, the forwarded DQoS parameter set includes parameters that express the type of compressor/decompressor (codec) to use, the baud rate to provide, etc. Additional DQoS parameters will be further described below.

Figure 1:
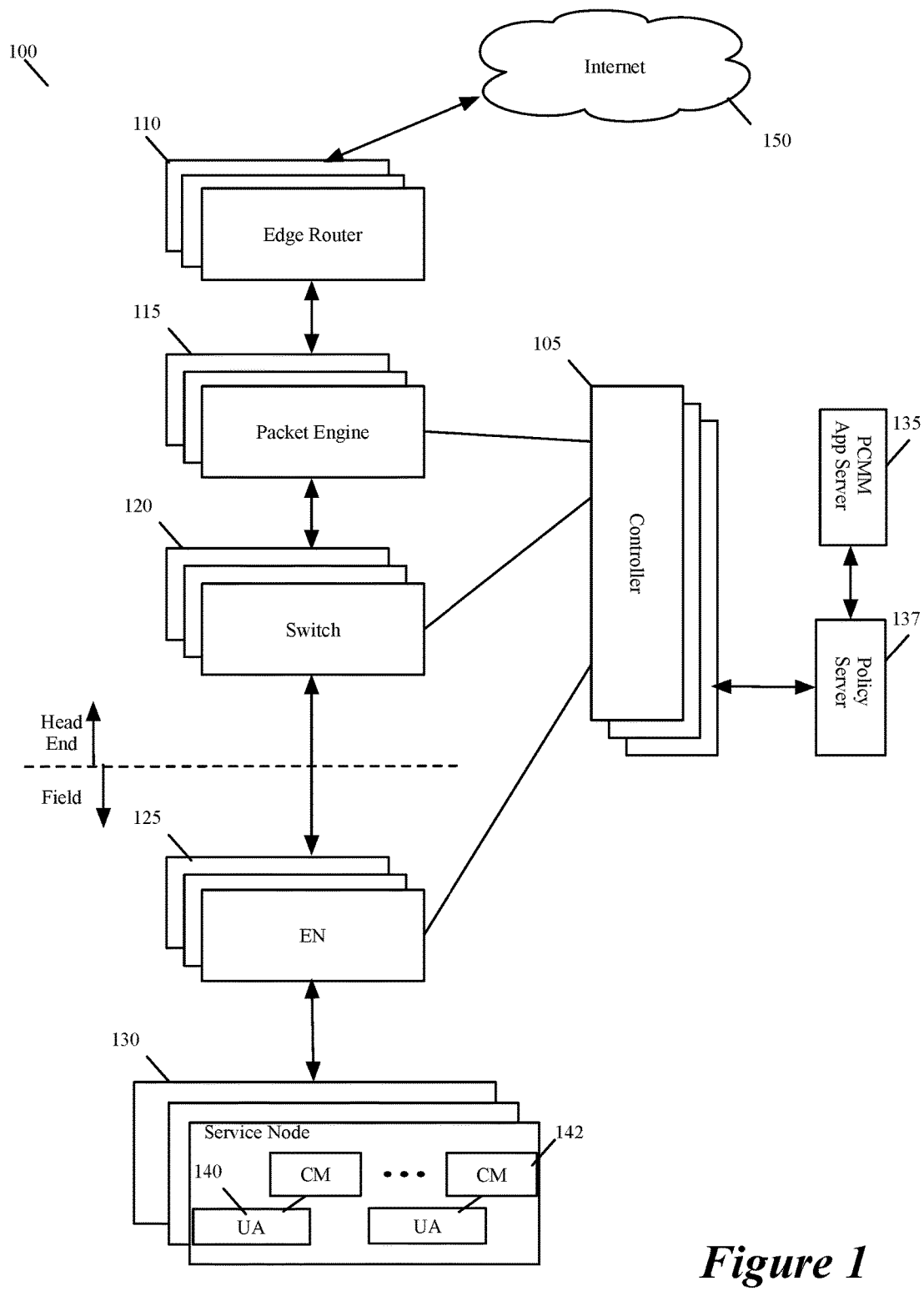
FIG. 1 illustrates the controller set and distributed cable management system of some embodiments.

In some embodiments, a set of one or more controllers that manage the modules of a distributed cable management system (DCMS) implements this method. FIG. 1 illustrates the controller set 105 and DCMS 100 of some embodiments. The DCMS 100 provides many different types of services (such as Internet access, analog television channels, digital television channels, on-demand channels, voice over IP, DOCSIS channels, etc.) to service nodes 130 at many different locations. The distributed architecture of this system is designed such that it can provide the service nodes with high-speed data for the desired services in a scalable, cost effect manner.

In addition to the controller set 105, the system 100 includes (1) a set of one or more edge routers 110, (2) a set of one or more packet engines 115, (3) a set of one or more switches 120, (4) several ENs 125, (5) one or more PacketCable Multimedia servers (PCMM) 135, and a (6) one or more policy servers 137. In some embodiments, the edge router set 110, packet engine set 115 and switch set 120 are located within one facility (referred to as the headend in the discussion below), while the ENs and service nodes are in remote locations (collectively referred to as the "field" in the discussion below). In some embodiments, the controller set 105, the PCMM 135, and the policy server 137 are also in the headend, while in other embodiments, one, two or three of these are in other facilities.

The edge router set 110 connect the packet engine set 115, and thereby the switches, ENs and service nodes, to the Internet 150. The edge routers handle north-south data packet traffic out of and into the DCMS 100. The packet engine set is responsible for routing packets to and from the devices 140 at the service nodes 130 through the switches 120, ENs 125, and cable modems 142 at the service nodes 130. Each packet engine has limited number of input ports, which may not be able to accommodate traffic for a far greater number of ENs for which the packet engine is responsible. Hence, one or more switches 120 are inserted between each packet engine and its associated set of ENs. Different embodiments use different techniques to direct packets to, and from, an EN from, and to, the EN's associated packet engine through their associated switch 120. Several methods for mapping the interfaces of packet engines and switches to each other and to service flows at the EN are described in U.S. Provisional Patent Application 62/141,801, entitled "Mapping Cable Service Flows to IP Network", U.S. Provisional Patent Application 62/141,804, entitled "Assigning QoS to Cable Service Flows", and U.S. Provisional Patent Application 62/141,808, entitled "Selective Configuration of Packet Engine for Cable Service Flows".

Each EN connects multiple service nodes to the cable headend of the DCMS 100. The services nodes that are services by one EN are typically within one contiguous geographic region. In some embodiments, a service node represents a subscriber of cable services. Such a subscriber can be a household, an apartment, an office, etc. A service node includes one or more cable modems 142 for receiving and transmitting cable signals on its neighborhood CATV cable.

A cable modem 142 at a service node 130 in turn translates the received cable signals into data for subscribing devices 140 (e.g., set top box (STB), customer premise equipment (CPE), computers, handheld devices, multimedia terminal adapter (MTA), etc.) of subscribed cable services (e.g., video on demand, voice over IP, etc.). In some embodiments, some of the subscribing devices have their own modems for directly receiving the subscribed services, such as an embedded MTA (eMTA). Cable modems connect end-user devices to the PCMM network of the DCMS 100. The PCMM network refers to the components of the system 100 that implement the PCMM specification, which is a cable industry standard specification.

In some embodiments, each EN 125 communicatively (1) connects to a switch 120 through one or more fiber optic cables to exchange digital data packets, and (2) connects to numerous service nodes (e.g., tens to hundreds of service nodes) through CATV cables to exchange radio frequency (RF) modulated signals. In some embodiments, each EN is associated with a MAC address, enabling a switch to direct to the EN the packets that are address to it and forward packets that are sent by the EN. This distributed architecture of system 100 is referred to as a remote MAC and PHY architecture because the in-the-field ENs that service multiple service nodes are MAC addressable, receive digital data packets, and perform the physical layer conversion to convert the digital data packets to RF signals in the field.

Each EN in some embodiments converts data packets from the cable headend into a DOCSIS compliant RF signal that are to be processed by DOCSIS compliant cable modems at the service nodes. In some embodiments, an EN strips the header information of the downstream IP packets it receives and delivers only the payload to the cable modem through the CATV cable. In other embodiments, an EN transmits the downstream IP packets in their entirety (header and payload) to the CATV cable. In some embodiments, the payloads of IP packets are digitized samples of RF waveforms, and the EN uses the digitized samples to reconstitute the RF waveform over the CATV cable. In some embodiments, the payloads of IP packets are QAM symbols, and the EN sends RF waveforms that are QAM modulated according to the received QAM symbols.

Each EN has static and dynamic service flows for processing upstream packets from the devices 140 at the service nodes 130 and downstream packets to the devices 140 at the service nodes 130. This processing entails directing the packets to their eventual destinations. It also entails applying different QoS guarantees on the data packets of the different data flows.

The controller set 105 defines the operation of the DCMS 100 by configuring the operation of the packet engines 115, switches 120, and ENs 125. One of the configurations performed by the controller set 105 is to dynamically provide to the ENs parameters that the ENs need to dynamically create service flows for PCMM connection sessions.

Figure 2:
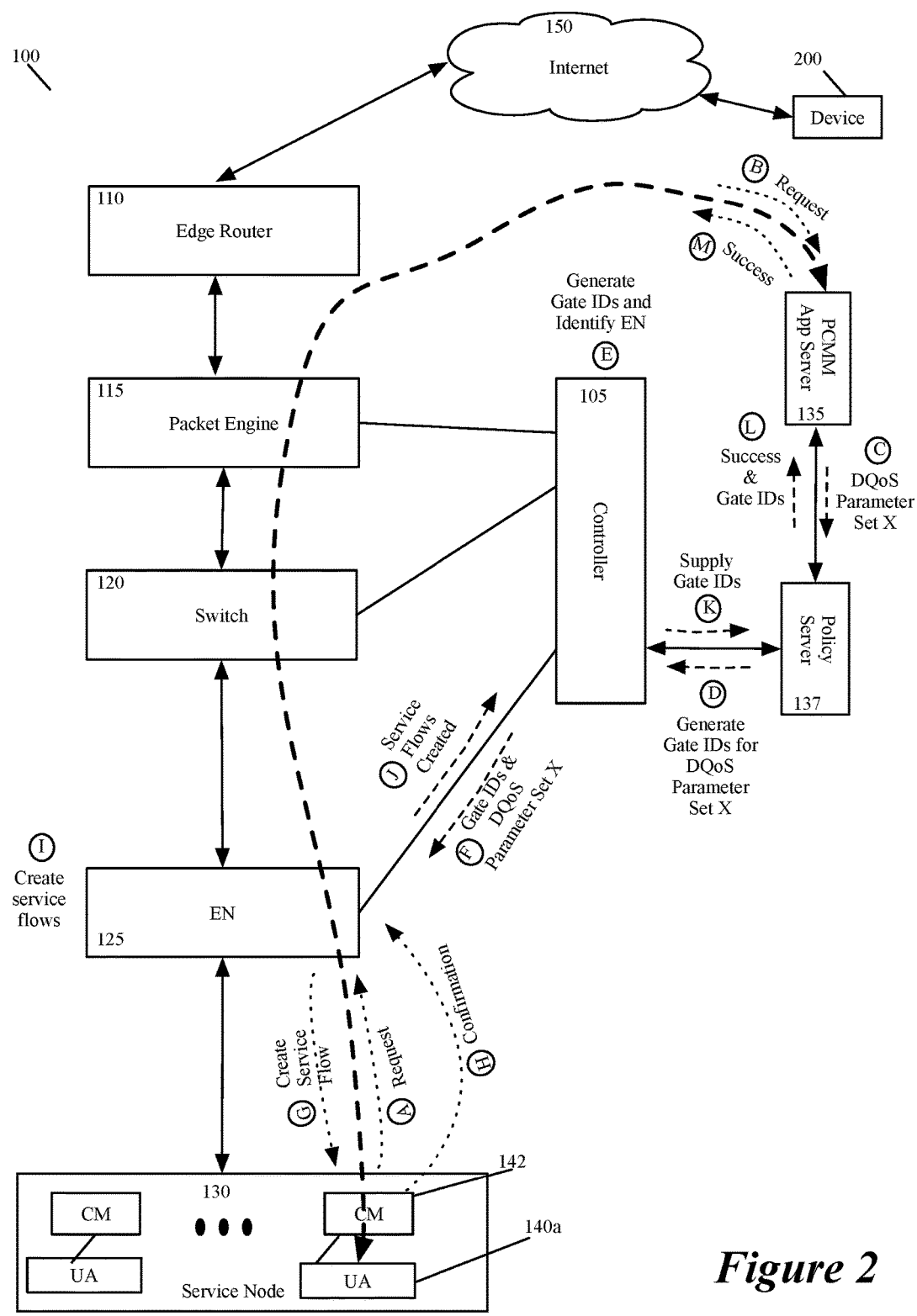
FIG. 2 presents a data flow diagram that illustrates the overall process for dynamically creating service flows for a Packet Cable Multi-Media (PCMM) connection session that is requested by a device at a service node.

FIG. 2 presents a data flow diagram that illustrates the overall process for dynamically creating service flows for a PCMM connection session that is requested by a device 140a at a service node 130. The device 140a can be any one of several devices, such as a SIP-trunked user agent (e.g., SIP phone that provides voice or video over IP), a computer or tablet (e.g., a device running a gaming application), a STB (e.g., a STB that provides video on demand service), etc. In the example illustrated in FIG. 2, the device 140a operates behind a CM 142 at the service node 130. In other cases, the device 140a can have its own embedded cable modem.

As shown, this process starts when the device 140a sends a PCMM connection session request to the PCMM application server 135. FIG. 2 depicts this start by showing the request leaving the device 140a and arriving at the PCMM application server 135, as noted by message designations A and B on this figure. As shown, this request traverses through the components of the DCMS 100 (e.g., the EN 125 connected to the device's service node and one or more of the other components 120, 115, and 110 of the DCMS 100), but is through an out-of-band communication channel (e.g., by using the SIP protocol) that is transparent to these components.

FIG. 2 illustrates the request reaching the application server 135 without going through the Internet 150 or some other external network. This implies that the application server is located in the same facility as the other components of the headend. In other embodiments, however, the application server is located in a different facility. In such case, the session request may have to be routed to the application server through the Internet or an external network.

The application server is a server that is responsible for application or session-level state and for applying session control policies. After receiving the session request, the application server determines based on its session control policies whether it should grant the request. When this servers determines that it should grant this request, it identifies the DQoS parameter set that is stored in the application server storage, or in another accessible storage, for the device 140a that has sent the connection request.

The application server then provides the DQoS parameter set to a policy server 137 with a session request as shown by the message designation C on FIG. 2. The policy server is responsible for applying resource control policies for the PCMM network infrastructure of the DCMS 100. After receiving the session request from the application server, the policy server sends a PCMM gate set request to the controller 105 along the DQoS parameter set for the connection session, as depicted by the message designation D on FIG. 2. To communicate with the controller set (as well as other components of the PacketCable network), the policy server use the Common Open Policy Service (COPS) protocol in some embodiments.

A gate is a logical entity in the DCMS 100 (in much the same way as it is in many cable modem termination system (CMTS) employed today) that is associated with a service flow with a QoS guarantee. In some embodiments, one gate controls one upstream service flow and another gate controls a downstream service flow that are needed to establish PCMM network connection. In some embodiments, the DQoS parameter set that is provided by the application server and then by the policy server (to the controller) includes (1) DQoS parameters for the downstream direction and (2) DQoS parameters for the upstream direction. By having two gates for the two different directions (upstream and downstream), the DCMS 100 can more easily define different DQoS parameters for the upstream and downstream directions and thereby provide different QoS guarantees for the different directions.

After receiving the request to create gates for a PCMM connection session, the controller 105 creates the gate identifiers (Gate IDs) for the two gates and identifies the EN that is responsible for connecting the device 140 to the PCMM network. In FIG. 2, these operations are depicted by the message designation E. After creating the Gate IDs, the controller provides the Gate IDs and the authorized DQoS parameter set (that it received from the policy server 137) to the identified EN (the EN that the controller identified), as depicted by message designation F in FIG. 2.

After getting the Gate IDs and the DQoS parameter set, the EN 125 directs the cable modem to create upstream and/or downstream service flow(s) for handling data packets for the requested PCMM connection session, as depicted with the designation G. With this request, the EN provide the cable modem 142 with one or more DQoS parameters. Based on these parameters, the cable modem specifies its service flow(s). These parameters allow the cable modem to use the correct encoding and/or decoding parameters (e.g., codecs, bit rates, etc.) for sending packets to the EN. Once the cable modem creates its service flow(s), the cable modem sends a confirmation to the EN about its creation of the service flow(s), as depicted by the designation H.

After getting the confirmation from the cable modem 142 that it has successfully created its service flow(s), the EN creates two service flows, one for the upstream direction and one for the downstream direction, and defines QoS parameters for each service flow to define the QoS for processing the packets in each direction for the requested PCMM connection session. These operations are depicted with the designation I in FIG. 2. The QoS parameters that the EN defines for each service flow are derived from the DQoS parameter set that the EN receives from the controller 105.

The EN 125 next provides a confirmation to the controller 105 of the service flows have been created, as depicted by designation J. The controller 105 then provides the Gate IDs to the policy server 137, as depicted by the message designation K in FIG. 2. As depicted by designation L, the policy server relays the Gate IDs to the application server 135, along with a Success message, to indicate that the process for initiating the connection session has been established. The application server then relays the Success message to the device 140a, as depicted by message designation M in FIG. 2. Again, this messaging is through an out-of-band communication channel that can traverse through the components of the DCMS 100 but are transparent to these components.

Figure 3:
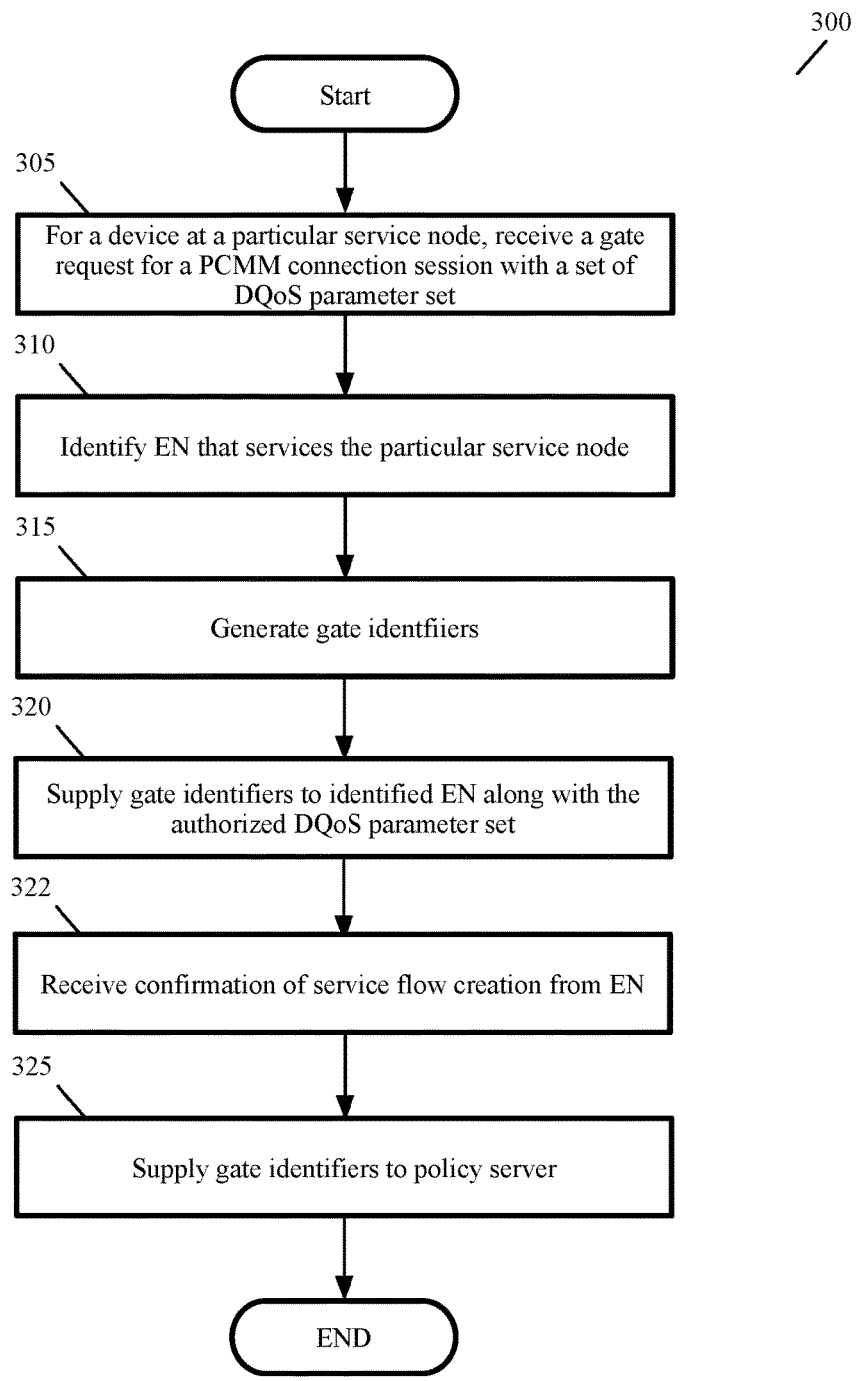
FIG. 3 illustrates a process performed by the controller of some embodiments to facilitate the dynamic creation of a service flow for a PCMM connection session request from a device.

FIG. 3 illustrates a process 300 performed by the controller 105 of some embodiments to facilitate the dynamic creation of a service flow for a PCMM connection session request from a device. As shown, the process 300 starts (at 305) when the controller 105 receives a gate request for a PCMM connection session from a policy server. The policy server supplies this request after a PCMM application server direct it to do so, when the PCMM application server receives a PCMM session request from a particular device at a particular service node. For the requested session, the application server (1) identifies the DQoS parameter set that is stored in the application server storage, or in another storage that is accessible by the application server, for the particular device, and (2) supplies the DQoS parameter set to the policy server so that it can relay (at 305) this DQoS parameter set with the gate request to the controller 120. In some embodiments, the policy server can change the DQoS parameter set based on the policy configurations that it enforces, before relaying a revised DQoS parameter set to the controller.

After receiving the gate request, the process identifies (at 310) the EN that is responsible for connecting the particular device to the PCMM network. The process 300 then creates (at 315) two gate identifiers for the requested PCMM connection session. After creating the Gate IDs, the process provides (at 320) the Gate IDs and the authorized DQoS parameter set (that it received at 305) to the identified EN (the EN identified at 310).

Next, at 322, the process receives confirmation of service flow creation from the EN. As described above and further described below, the EN will create its service flows once it directs the cable modem to create corresponding service flow(s) and receives confirmation from the cable modem that it has created the service flow(s). If either the cable modem or the EN fails to create it service flow(s), the EN can return an error to the controller after being directed to create the service flows at 320. In such a case, the controller would return to the device (through the policy server and the application server) a Failed message to indicate that it was not able to create service flows for the requested PCMM connection session.

After receiving confirmation (at 322) for the creation of the service flows, the process 300 then provides (at 325) the Gate IDs to the policy server, so that the policy server and/or application server can use the Gate IDs to later manage (e.g., terminate, adjust QoS parameters, etc.) the service flows created for the Gate IDs. After 325, the process 300 ends.

Figure 4:
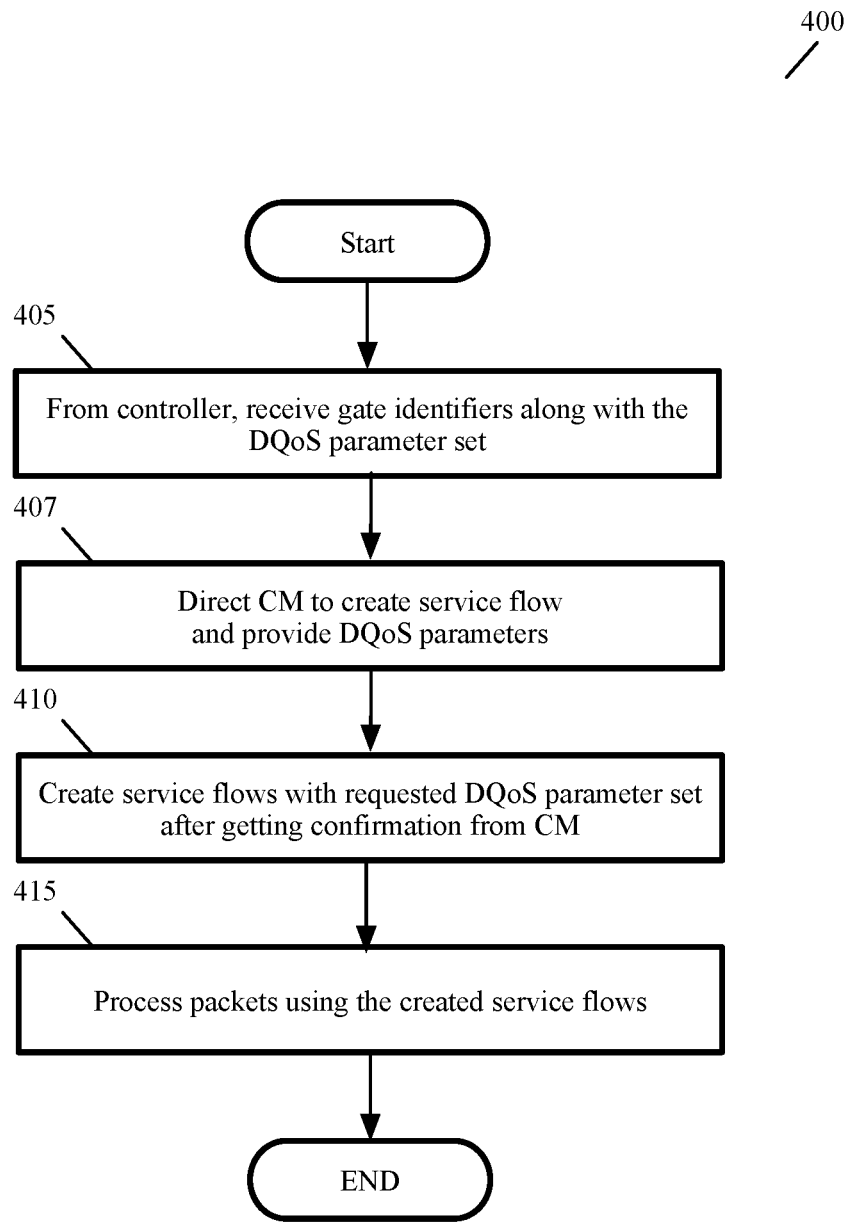
FIG. 4 illustrates a process that an Ethernet node (EN) performs to dynamically create service flows with QoS guarantees for a PCMM connection session.

FIG. 4 illustrates a process 400 that an EN performs to dynamically create service flows with QoS guarantees for a PCMM connection session. As shown, the process 400 starts when the EN receives (at 405) Gate IDs and a set of authorized DQoS parameters from a controller. In some embodiments, the received parameters are part of a service-flow request that the EN receives for the received Gate IDs.

Next, at 407, the process directs the cable modem to create service flow(s) for handling data packets for the requested PCMM connection session. With this request, the process 400 provide the cable modem 142 with one or more DQoS parameters. Based on these parameters, the cable modem specifies its service flow(s). These parameters allow the cable modem to use the correct encoding parameters (e.g., codecs, bit rates, etc.) for sending packets to the EN. Once the cable modem creates a service flow, the cable modem sends a confirmation to the EN about its creation of the service flow. In some cases, the cable modem might not be able to create the requested service flow. In these situations, the cable modem will return a message to the EN that it has failed to create a service flow.

After receiving confirmation from the cable modem regarding the creation of the service flow(s), the process creates (at 410) two service flows for the supplied Gate IDs once the cable modem provides confirmation that it has created service flow(s). Of the two service flows created by the process 400, one service flow is for upstream traffic (i.e., for data packets sent from the particular device at the particular service node) associated with the upstream Gate ID, while the other service flow is for downstream traffic (i.e., for data packets sent to the particular device at the particular service node) associated with the upstream Gate ID. At 410, the process 400 associates one or more QoS parameters to each service flow. As mentioned above, the QoS parameters are derived by the received authorized DQoS parameter set, and the QoS parameter(s) of the upstream service flow can be different than the QoS parameter(s) of the downstream service flow.

After creating the requested service flows, the process 400 starts to use (at 435) the created service flows to process data packets to and from the particular device through the PCMM connection session, until the PCMM connection session ends. Once the PCMM connection session ends, the process 400 ends. Once the PCMM connection session ends, the created service flows can be discarded and the gate identifiers can be de-allocated. Deletion of service flows and gate identifiers will be further described below.

In several embodiments described above, the EN 125 creates two service flows and starts to use these two service flows after receiving a service flow request from the controller 105. In some embodiments, however, the controller can direct the EN to create service flows that are initially inactive until the controller set can direct the identified EN to activate the service flows. This is accomplished in some embodiments by having the service flow request include a parameter that specifies whether the created service flows should be immediately active or initially inactive. This active/inactive feature is beneficial in embodiments where the PCMM application server can facilitate a PCMM-enabled device at the service node to set up phone calls through the PCMM network infrastructure. This is because it allows the PCMM application server to ensure that the recipient of the call is available to receive the call before activating the service flow and starting PCMM connection session or charging the device for the call. It also allows the identified EN to reserve bandwidth for the service flow to ensure that once the service flow becomes active, there will be sufficient bandwidth to process packets for this flow.

Figure 5:
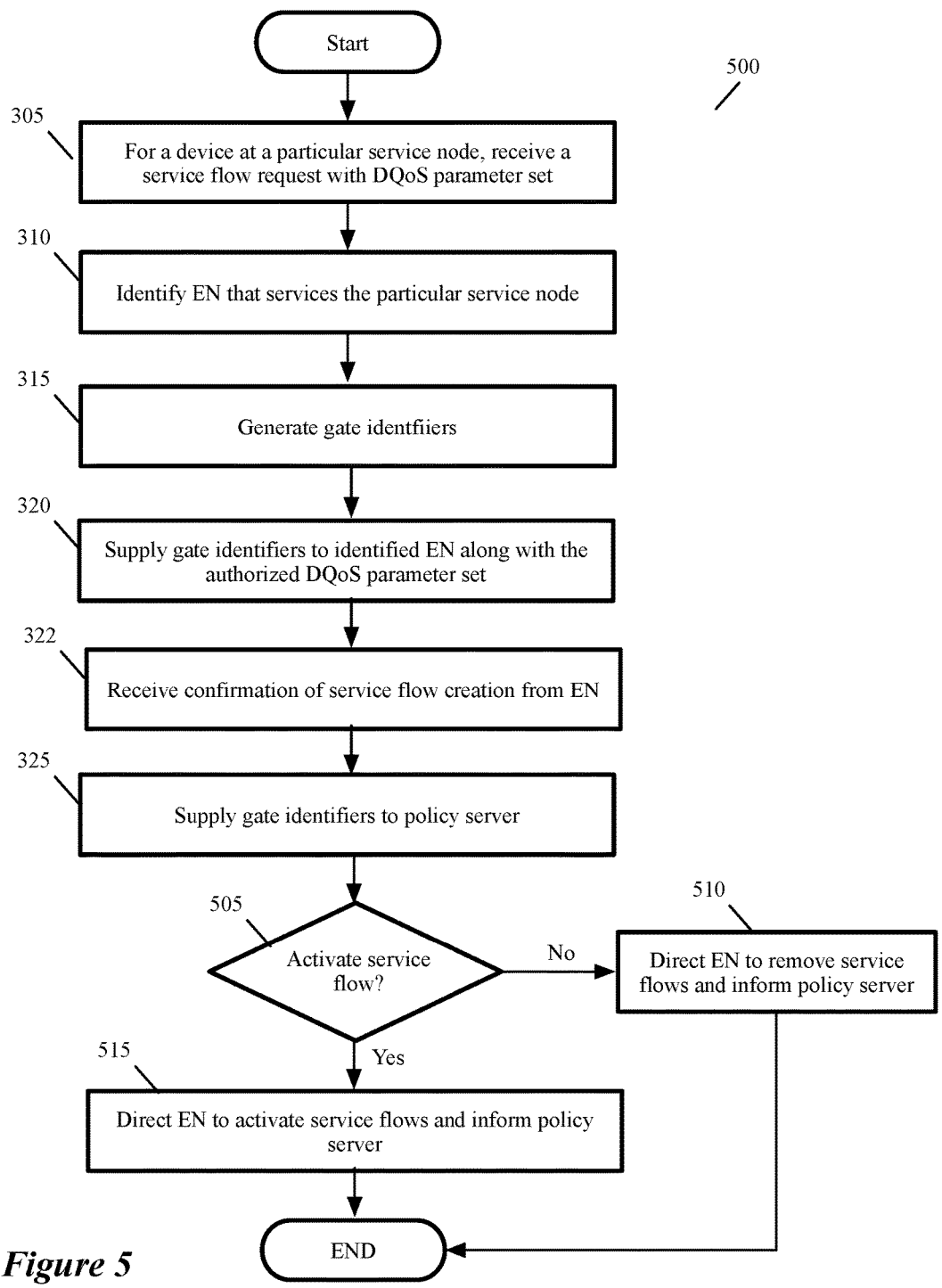
FIG. 5 illustrates a process of the controller in embodiments that allow the controller to request creation of active/inactive service flows.

In the embodiments that allow the controller to request creation of active/inactive service flows, the operation of the controller and the EN is slightly different than that shown in FIGS. 3 and 4. FIG. 5 illustrates a process 500 of the controller 105 in embodiments that allow the controller to request creation of active/inactive service flows. The process 500 is similar to the process 300 of FIG. 3, except that (1) the process 500 directs (at 320) the identified EN to create two create two inactive service flows for the two supplied Gate IDs, and (2) after supplying the created gate identifiers to the policy server at 325, the process 500 does not end.

Instead, after 325, the process 500 enters a state 505 where it stays until it determines whether it should activate the service flows that it directed (at 320) the EN to create. In some embodiments, the controller 105 uses the process 500 to facilitate the establishment of a PCMM-enabled phone call or video conference. In such cases, the process 500 would stay at 505 until it determines that the recipient of the phone call request or video conference request is available. This approach would be beneficial in that it would allow the PCMM infrastructure not to start to bill a subscriber or enable a PCMM connection session until it is assured that the recipient at the other end of the call or video conference request is available.

When the process 500 determines (at 505) that it should not activate the service flow, it directs (at 510) the EN to discard the inactive service flows that it has created. The process also informs (at 510) the policy server that it has failed to create an active PCMM connection session. The policy server then informs the PCMM application server of this failure, and the application server relays this failure to the device that requested the PCMM connection session.

On the other hand, when the process 500 determines (at 505) that it should activate the service flow, the process directs (at 515) the EN to activate the service flows that it has created in response to receiving the service flow request at 320. The process also informs (at 515) the policy server that it has successfully created an active PCMM connection session. The policy server then informs the PCMM application server of this success, and the application server relays this success to the device that requested the PCMM connection session. After 510 or 515, the process 500 ends.

In some embodiments, the controller 105 uses the process 500 when it wants to initially create service flows in an initial inactive state, while using the process 300 of FIG. 3 when it wants to create service flows that are immediately in an active state. As mentioned above, the controller designates the initial active/inactive state of the requested service flows in some embodiments by a parameter in a service flow request that it sends to the EN at 320.

Figure 6:
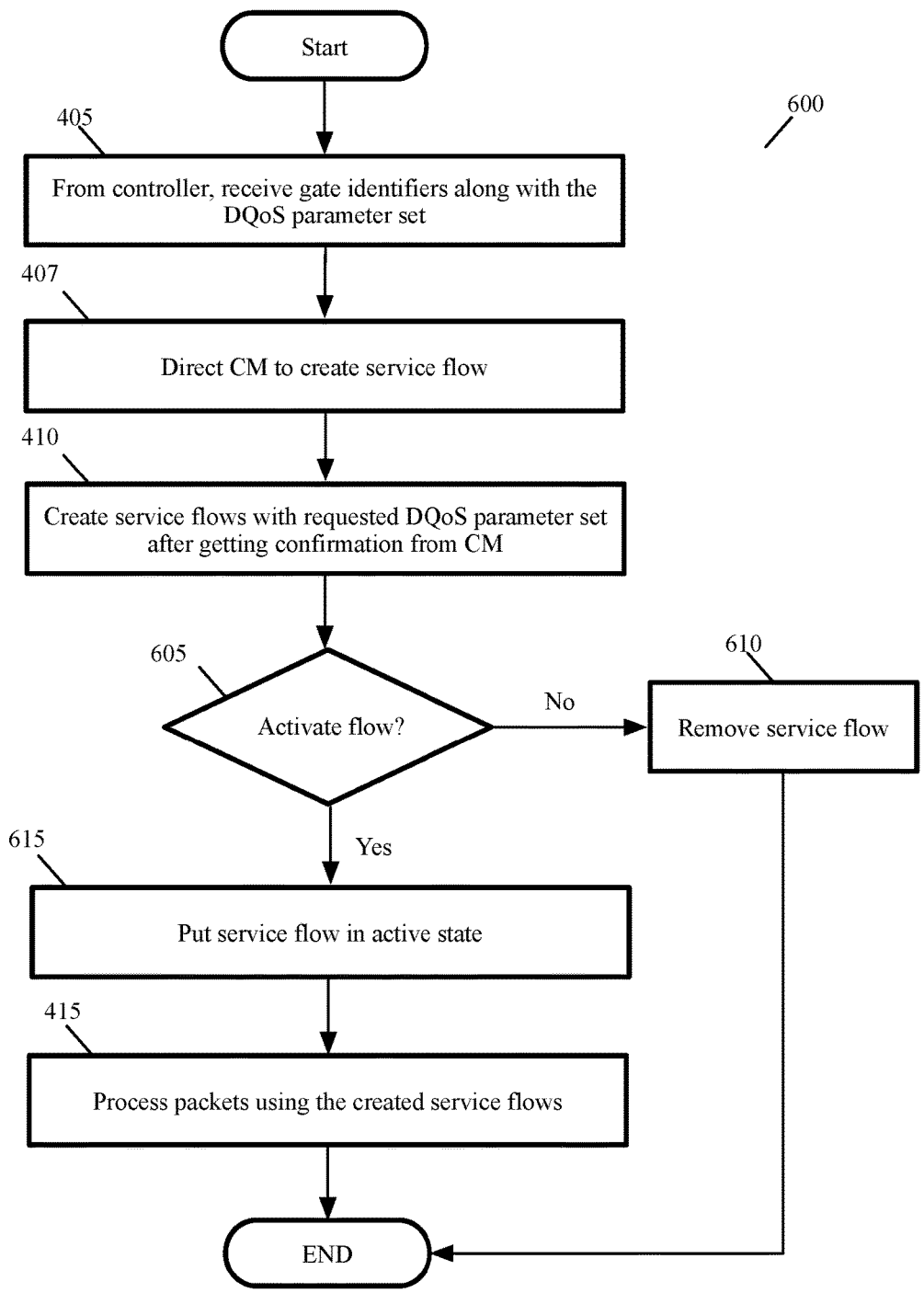
FIG. 6 illustrates a process of an EN in embodiments performs to create initially inactive service flows and to later activate or discarding these service flows.

FIG. 6 illustrates a process 600 of an EN 125 in embodiments performs to create initially inactive service flows and to later activate or discarding these service flows. The process 600 is similar to the process 400 of FIG. 4, except that between operations 410 and 415, the process 600 performs operations 605-615. Specifically, after creating (410) service flows for the controller supplied Gate IDs, the process 600 does not transition to 415.

Instead, it determines (at 605) whether it should have the service flows placed in an active state. An inactive service flow is one that is not inserted in the forwarding tables of the EN in some embodiments, or is placed in the EN's forwarding tables but it is designated as an inactive forwarding flow in other embodiments. Conversely, in some embodiments, an active service flow is one that is inserted in the EN's forwarding tables, or in other embodiments, is placed in the EN's forwarding tables but it is designated as an inactive forwarding flow.

The process 600 determines (at 605) that the service flows should be active when the service flow request (that was received at 405) designates that these flows should be active. Alternatively, when the received service flow request designates that these flows should be inactive, the process remains at 605 until it receives instructions to activate or discard the created service flows.

If the process determines (at 605) that it should not activate the service flows, the process discards (at 610) the created service flows and Gate IDs, and then ends. On the other hand, when the process determines (at 610) that it should activate the service flows, the process designates (at 615) the created service flows as active, and then transitions to 415, which was described above.

Figure 7:
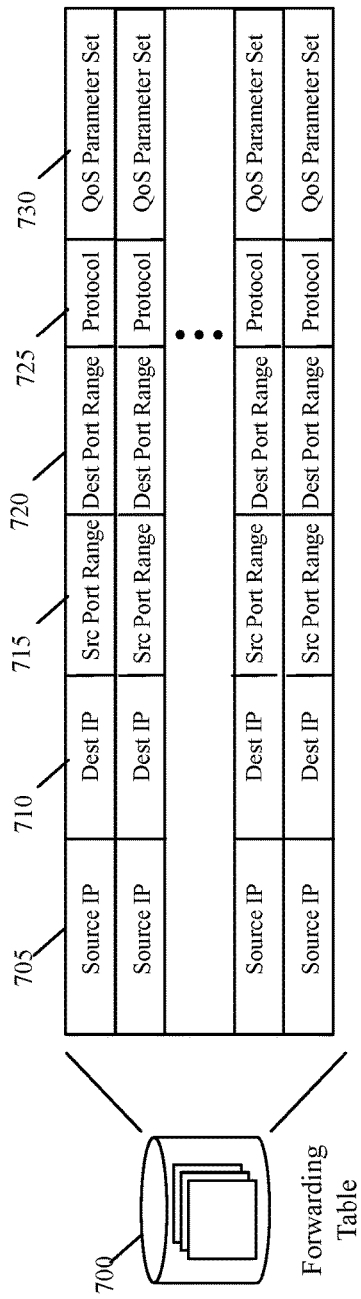
FIG. 7 illustrates examples of service flows that are stored by an EN.

FIG. 7 illustrates examples of service flows that are stored by an EN 125. As shown, the service flows are flow entries in a forwarding table storage 700 that the EN's packet processor uses to determine how to process packets to and from the devices 140 of the service nodes 130. Each service flow includes five tuples, which are source IP 705, destination IP 710, source port range 715, destination port range 720, and protocol 725 (e.g., UDP). In some embodiments, the source and destination port ranges 715 and 720 can each specify only one value or several values. Also, in some embodiments, the source and destination IP fields specify a range of IP values (e.g, by providing an IP address and a mask value that defines a range about the provided IP address). The five tuples are used to match each service flow against the corresponding values of header values of received packets.

As shown, each service flow also include a QoS parameter set that provides one or more QoS parameters for defining the QoS level to provide to any packet that matches the service flow. When the EN's packet processor identifies a service flow as the matching service flow for a received packet, the packet process uses the QoS parameter set to identify the QoS that it needs to provide in processing the packet. In addition to the five tuples and QoS parameter set, each service flow can include other parameters, such as action fields that define the type of action (e.g., pass through, drop, etc.) to perform on a received packet.

In some embodiments, several of the service flows illustrated in FIG. 7 are service flows associated with a dynamically created secondary PCMM connection session (i.e., are secondary service flows that are dynamically created). Also, as mentioned above, some embodiments create an upstream secondary service flow and a downstream secondary service flow for each PCMM connection session.

Figure 8:
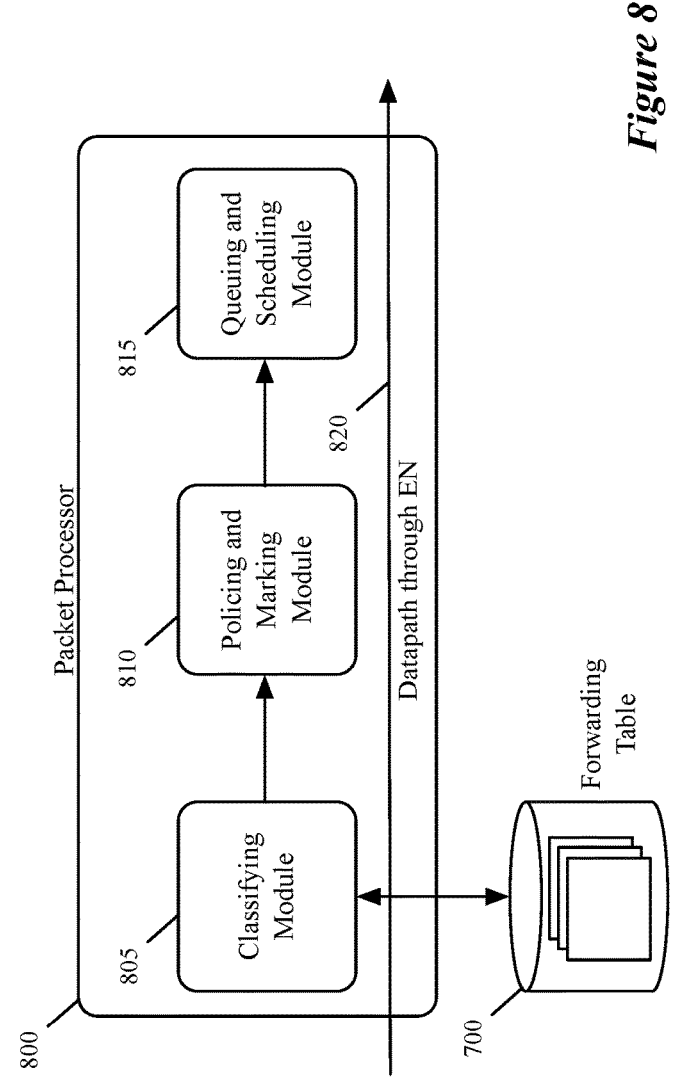
FIG. 8 conceptually illustrates the modules of the packet processor of an EN of some embodiments.

FIG. 8 conceptually illustrates the modules of the packet processor 800 of an EN 125 of some embodiments. These modules can be implemented as hardware and/or software modules by dedicated or general purpose hardware (e.g., by ASIC, FPGA, or microprocessor). The modules illustrated in this figure are conceptual illustration of certain functionality that is performed by the EN's packet processor in some embodiments. One of ordinary skill will realize that these functionalities can be performed by fewer or more modules in some embodiments.

As shown, the packet processor 800 includes a classifying module 805, a policing and marking (PM) module 810, and a queuing and scheduling (QS) module 815 that are in the datapath 820 (e.g., downstream datapath or upstream datapath) of the EN. The classifying module compares a packet with the service flows to identify a matching service flow for the packet and to assign a tag to the packet that defines the type of QoS that the packet processor needs to provide to the packet. FIG. 8 shows the classifier 805 accessing the forwarding table storage 700 to try to identify a matching service flow for a packet. In some embodiments, the classifier also uses a cache storage (not shown) to store the service flows that have matched recently received packets. The cache storage is easier to search (e.g., as it can be hash indexed) in some embodiments. Accordingly, the classifier first searches the cache storage to identify a matching service flow, and if it does not find the matching service flow in the cache storage, it then searches the forwarding table storage 700.

The PM module 810 then analyzes the tag assigned to the packet with the current packet rate that the packet processor (e.g., the PM module) maintains for the packet's data flow to determine whether to let the packet pass through, or apply a policer action to the packet (e.g., to drop the packet or mark the packet for slower throughput). Based on the PM module's determination, a packet may be re-tagged for slower throughput. If the packet is not dropped as a result of the PM module's decision, the packet is provided to the QS module to store the packet in queue and schedule is transmission from queue based on its tag. The packet is sent out from the EN based on its queue and its schedule.

For upstream traffic of a CPE at a service node 130 that has a dynamic service flow created in the EN 125, the cable modem 142 that relays the CPE's data packets at the service node 130 to the EN 125 also need to have a service flow to associate the CPE's data packets to the dynamically created service flow on the EN. When a cable modem receives any data packet from the CPE, the cable modem matches the data packet with the classifiers, in order to associate the data packet with the upstream service flow on the EN, and then sends along the data packet to the EN using that upstream service flow. For service flows (e.g., secondary service flows that are dynamically created), the cable modem can reserve bandwidth from the EN for the upstream service flow to ensure that the desired QoS can be provided for the service flow.

The EN then matches the packet to its upstream service flow and then performs QoS operations based on the service flow's associated QoS parameter set. In some embodiments, the EN directs the cable modem to create a service flow after the EN creates (at 410) its own service flows for a requested PCMM connection session. The EN not only enforces the QoS guarantee on the upstream traffic to the CPE, but it also performs the QoS operations on the downstream traffic to the CPE.

In some embodiments, the dynamically created service flow is a secondary service flow that supplements one or more service flows that are statically created for processing data packets from the devices of a service node. In these embodiments, the cable modem sends a data packet from a CPE to the EN along a secondary flow if one exists once the cable modem matches the data packet header values to the service flow classifiers. If there is no secondary service flow, the cable modem sends the data traffic along the primary service flow.

Similarly, for downstream traffic coming form the EN to a cable modem, it is the job of EN to match the traffic with the classifiers associated with a flow to make sure the traffic is sent on a correctly matched service flow. If there is no match, the EN sends the traffic to the cable modem along a primary service flow. If there is match, the traffic is sent on the secondary service flow. Again, if a secondary flow is created after traffic is started, the EN will switch to this secondary flow once it is created. The active/inactive nature of actual traffic depends on how the solution is implemented and the traffic may start or may not start prior to secondary service flow creation.

Different embodiments delete service flows differently. In some embodiments, once the CPE terminates a PCMM connection session, the CPE sends an out-of-band message to the PCMM application server to inform it that it has ended the PCMM connection session. The application server, in turn, informs the policy server that the session has ended. The policy server provides a gate delete command to the controller, which then (1) informs the EN that the gate identifiers and associated service flows have to be discarded, and (2) de-allocates the gate identifiers that it created. The EN then eliminates the secondary service flows that it creates for the PCMM connection session, and de-allocates their gate identifiers. The EN also informs the cable modem that it can discard the service flow(s) that it has for the PCMM connection session.

In some embodiments, the DCMS 100 also includes one or more record keeping servers (RKS) for keeping track of billing associated with a PCMM phone call or video conference. In some such embodiments, one of the components of the DCMS has to inform the RKS when a call (or video conference) is established and is terminated so that the RKS can starts and end its billing for the call (or video conference). For instance, in some embodiments, the controller informs the RKS each time that it changes the status of service flows for the PCMM connection session. The status of the service flow include: active, terminated, and inactive/reserved (to indicate that the service flows have been created but are not in an active state). The RKS generates a billing record to charge for a phone call or video conference between the time that the service flow is active and terminated.

In different embodiments, the CMS can provide different DQoS parameters to the controller. Examples of DQoS parameters include: max_traffic_rate, max_traffic_burst, min reserved rate, min reserved_pkt_size, max_concat_burst, nominal_polling_interval, tolerated_poll_jitter, unsolicit_grantsize, nominal_grant_interval, tolerated_grant_jitter, grants_per_interval, max_latency, active_timeout, admitted_timeout, scheduling_type, request_policy, type_of_service_params, direction, dscp_overwrite, app_id, peak_traffic_rate, minimum_buffer, target_buffer, and maximum_buffer. Based on the codec type (e.g. G.711, G.729, G.723 etc.) and the packetization period (e.g., 10 ms, 20 ms, 30 ms etc), the CMS calculates the appropriate QoS params and sends to controller for PC DQoS call. If there is not enough bandwidth/capabilities on EN to accommodate these parameters, the service flow creation could be rejected. For voice call, the subscriber will get overflow/busy tone on such a failure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
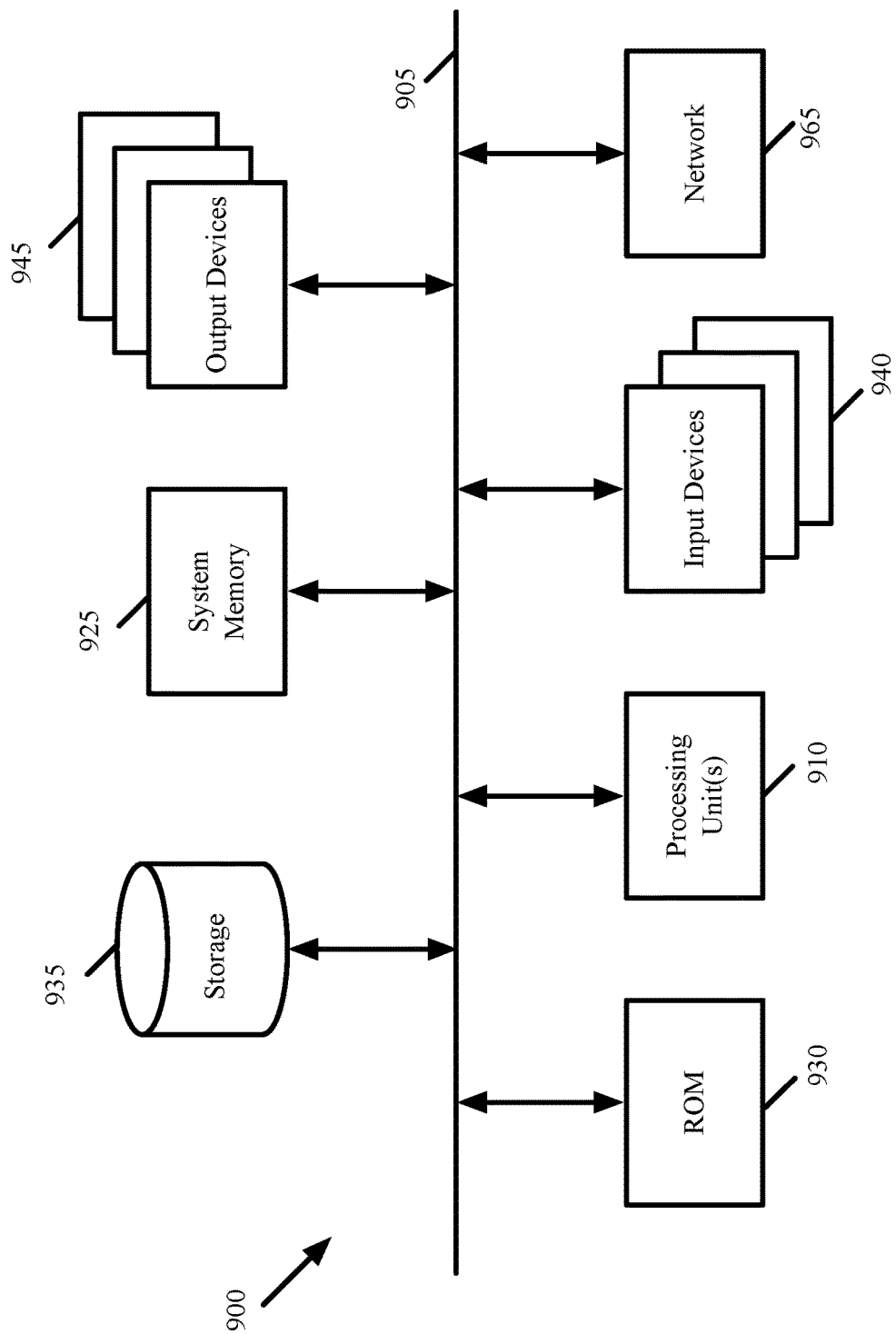
FIG. 9 conceptually illustrates an electronic system with which some embodiments of the invention are implemented.

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, the examples described above dynamically define one upstream PCMM service flow and one downstream PCMM service flow per PCMM connection request that is made by a user agent 140 at a service node 130. However, in some embodiment, a PCMM connection request from a user agent can cause the PCMM application server and/or policy server to establish an asymmetric set of service flows, e.g., one upstream service flow and three downstream service flows, for the requested PCMM connection.

In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of establishing a connection session in a distributed cable management system including a plurality of in-the-field Ethernet Nodes (ENs) that convert digital data packets received over a fiber optic cable from a cable head end into RF signals for distribution over CATV cable to a plurality of service nodes, comprising:

receiving a request by a policy server in the cable head end of the distributed cable management system in an out-of-band communication channel for a connection session for a client device coupled to a first service node of the plurality of service nodes in the distributed cable management system and a first set of dynamic quality of service (DQoS) parameters associated with an upstream service flow of the connection session and a second set of dynamic DQoS parameters associated with a downstream service flow of the connection session;

identifying an in-the-field Ethernet node (EN) of the plurality of in-the-field ENs by a Media Access Control (MAC) address associated with the EN that connects to the first service node and to a switch in the cable head end, wherein the identified EN converts RF signals received from the first service node over the CATV cable into digital data packets for transmission over fiber optic cable to the cable headend and wherein the out-of-band communication channel is transmitted through the identified EN between the client device and the head end and is transparent to the identified EN; and directing by the policy server the identified EN to create the connection session including the upstream service flow with the first set of dynamic quality of service (DQoS) parameters and the downstream service flow with the second set of dynamic DQoS parameters, wherein the request for the connection session from the device is received by the policy server in the cable head end through the identified EN in the out-of-band communication channel.

2. The method of claim 1, further comprising:
creating the requested connection session by the policy server in the cable headend in response to receiving a request from the device for the connection session, wherein the policy server is directed by a multi-media (MM) application server to create the requested connection session.

3. The method of claim 2, wherein receiving the request in the out-of-band communication channel includes receiving the request from the PCMM application server through the identified EN in the out-of-band communication channel that is transparent to the identified EN.

4. The method of claim 2,
wherein the PCMM application server identifies the first and second sets of DQoS parameters based on configuration data that the PCMM application server retrieves based on the identity of the device; and
wherein the PCMM application server provides the first and second sets of DQoS parameters to the policy server and the policy sever provides the first and second sets of DQoS parameters with the request for the connection session.

5. The method of claim 4, wherein the first and second sets of DQoS parameters are preconfigured for the device.

6. The method of claim 1, wherein the DQoS parameter set comprises a type of compressor/decompressor (codec) a baud rate, or packet header classifiers.

7. The method of claim 6, wherein the packet header classifiers comprise IP header value and at least one UDP port value.

8. The method of claim 1, further comprising:
generating a gate set request for the connection session to a controller server in the cable headend to establish a first gate for the first set of DQoS parameters associated with an upstream service flow of the connection session and a second gate for the second set of dynamic DQoS parameters associated with a downstream service flow of the connection session; and
providing to the identified EN the Gate ID for the first gate and the first set of DQoS parameters associated with the upstream service flow of the connection session and the Gate ID for the second gate and the second set of dynamic DQoS parameters associated with the downstream service flow of the connection session.

9. The method of claim 1, wherein the receiving, identifying and directing operations are performed by a controller server cluster that includes more than one controller server.

10. The method of claim 1, wherein the requested connection session is for processing at least one of voice packets, video packets, or game-application packets.

11. An Ethernet node in a distributed cable management system, coupled to a plurality of service nodes and at least one head end packet switch in a cable head end, wherein the Ethernet Node converts RF signals received from the plurality of service nodes over a CATV cable into digital data packets for transmission over a fiber optic cable to the cable head end, comprising:
at least one memory device for storing a forwarding table; and
at least one processing device configured to:
receive a connection session request for an identified service node of the plurality of service nodes in an out-of-band communication channel, wherein the connection session request includes a first set of dynamic quality of service (DQoS) parameters for an upstream service flow and a second set of dynamic DQoS parameters for a downstream service flow;
transmit the connection session request to the identified service node;
receive a confirmation of establishment of the connection session;
establish the upstream service flow with the first set of DQoS parameters;
establish the downstream service flow with the second set of DQoS parameters, wherein the second set of DQoS parameters are different from the first set of DQoS parameters; and
wherein the Ethernet node is located remotely from the plurality of service nodes and the at least one head end packet switch and is identified by a Media Access Control (MAC) address associated with the Ethernet node.

12. The Ethernet node of claim 11, wherein the at least one processing device is further configured to:
store the upstream service flow with the first set of DQoS parameters in the forwarding table; and
store the downstream service flow with the second set of DQoS parameters in the forwarding table.

13. The Ethernet node of claim 12, wherein the at least one processing device is further configured to transmit the connection session request to the identified service node by:
convert the connection session request from an Ethernet data packet into a Data Over Cable Service Interface Specification (DOCSIS) compliant RF signal for transmission over a CATV cable to the identified service node.

14. The Ethernet node of claim 13, further comprising:
a classifying module configured to:
compare a data packet with a plurality of service flows in the forwarding table;
identify a matching service flow and associated Quality of Service (QoS) parameters for the matching service flow; and
assign a tag to the data packet, wherein the tag defines a level of QoS associated with the QoS parameters.

15. The Ethernet node of claim 14, further comprising:
a policing and marking module configured to:
analyze the tag associated with the data packet; and
perform QoS operations on the data packet based on the tag.

16. The Ethernet node of claim 15, further comprising:
a queuing and scheduling module configured to:
store the data packet in a queue based on the tag; and
schedule the data packet for transmission from the queue based on the tag.

17. The Ethernet node of claim 16, wherein the at least one processing device is configured to receive the connection session request from a policy server in a head end facility of the distributed cable management system.

18. The Ethernet node of claim 17, wherein the at least one processing device is configured to receive the connection session request from the policy server in the out-of-band communication channel.

19. The Ethernet node of claim 18, wherein the DQoS parameter parameters include one or more of: a type of compression, a baud rate or a packer header classifier.

20. The Ethernet node of claim 19, wherein the packet header classifier includes one or more of: an IP header value or a UDP port value.

* * * * *